United States Patent
Kowalski

(10) Patent No.: US 6,386,695 B1
(45) Date of Patent: May 14, 2002

(54) PRINT SPEED, PRINT QUALITY, BLEED, AND WATERFASTNESS WITH CATIONIC BLACK PIGMENTS AND UNDERPRINTING WITH ANIONIC DYES

(75) Inventor: Mark H. Kowalski, Corvallis, OR (US)

(73) Assignee: Hewlett-Packard Company, Palo-Alto, CA (US)

( * ) Notice: Subject to any disclaimer, the term of this patent is extended or adjusted under 35 U.S.C. 154(b) by 0 days.

(21) Appl. No.: 09/660,551

(22) Filed: Sep. 11, 2000

(51) Int. Cl.$^7$ .............................................. G01D 11/00
(52) U.S. Cl. ........................... 347/100; 347/101; 347/96
(58) Field of Search ................................. 347/100, 101, 347/96

(56) References Cited

U.S. PATENT DOCUMENTS

| | | | |
|---|---|---|---|
| 5,085,698 A | 2/1992 | Ma et al. | 106/20 |
| 5,169,438 A | 12/1992 | Matrick | 106/22 R |
| 5,180,425 A | 1/1993 | Matrick et al. | 106/22 R |
| 5,549,740 A * | 8/1996 | Takahashi et al. | 347/100 |
| 5,555,008 A | 9/1996 | Stoffel et al. | 347/100 |
| 5,695,820 A | 12/1997 | Davis et al. | 427/261 |
| 5,723,179 A | 3/1998 | Wong et al. | 427/258 |
| 5,745,140 A | 4/1998 | Stoffel et al. | 347/100 |
| 5,746,818 A * | 5/1998 | Yatake | 347/100 |
| 5,801,738 A | 9/1998 | Stoffel et al. | 347/100 |
| 5,985,015 A * | 11/1999 | Kanaya | 106/31.6 |

FOREIGN PATENT DOCUMENTS

| | | | |
|---|---|---|---|
| EP | 0838507 | 10/1996 | C09D/11/00 |
| EP | 0842994 | 5/1998 | C09D/11/00 |
| EP | EP 0879857 A | 11/1998 | C09D/11/00 |
| EP | EP 0953616 A | 11/1999 | C09D/11/00 |
| JP | JP 101853046 A | 7/1998 | C09D/11/02 |

\* cited by examiner

*Primary Examiner*—John Barlow
*Assistant Examiner*—Manish S. Shah

(57) ABSTRACT

A method of printing an ink onto a print medium is provided. In the method, two inks are employed, a first ink that includes at least one water-soluble color dye that has a first charge, e.g., anionic, and a second ink that includes at least one black pigment that has a second and opposite charge, e.g., cationic. The method comprises: (a) providing the first ink, which contains at least one water-soluble, anionic color dye and at least one surfactant; (b) providing the second ink, which contains at least one cationic black pigment; (c) printing in a first pass across the print medium the first ink; (d) printing the second ink over the first ink, totally covering and overlapping the first ink, whereby the cationic black pigment(s) reacts with the anionic color dye(s) to form an insoluble complex on the print medium, and the surfactant draws the vehicle into the print medium, thereby improving print speed, print quality, bleed, and waterfastness of the ink. A printed ink set is also provided. The printed ink set comprises the cationic black pigment-based ink printed over the anionic color dye-based ink.

23 Claims, No Drawings

PRINT SPEED, PRINT QUALITY, BLEED, AND WATERFASTNESS WITH CATIONIC BLACK PIGMENTS AND UNDERPRINTING WITH ANIONIC DYES

TECHNICAL FIELD

The present invention relates generally to ink-jet inks, and, more particularly, to improving various aspects of the resulting print by an underprinting process.

BACKGROUND ART

Thermal ink-jet printers offer a low cost, high quality, and comparatively noise-free option to other types of printers commonly used with computers. Such printers employ a resistor element in a chamber provided with an egress for ink to enter from a plenum. The plenum is connected to a reservoir for storing the ink. A plurality of such resistor elements are arranged in a particular pattern, called a primitive, in a printhead. Each resistor element is associated with a nozzle in a nozzle plate, through which ink is expelled toward a print medium. The entire assembly of printhead and reservoir comprise an ink-jet pen.

In operation, each resistor element is connected through a conductive trace to a microprocessor, where current-carrying signals cause one or more selected elements to heat up. The heating creates a bubble of ink in the chamber, which is expelled through the nozzle toward the print medium. In this way, firing a plurality of such resistor elements in a particular order in a given primitive forms alphanumeric characters, performs area-fills, and provides other print capabilities on the medium.

Ink-jet inks used in thermal ink-jet printing typically comprise a colorant and a vehicle, with the vehicle often containing water and other relatively low surface tension liquids.

The tight tolerances of the nozzles (typically less than 30 $\mu$m diameter) require that the ink not clog the nozzles. Further, repeated firings of the resistor elements, which must withstand about 100 million firings over the life of the ink cartridge, can result in fouling of the resistor element. Finally, the ink composition must be capable of interacting with the print medium, especially paper, to penetrate the paper without undue spreading, and the ink composition should be smear and water resistant on the paper.

Inks are known which possess one or more of the foregoing properties. However, few ink compositions are known that posses all of those properties, since an improvement in one property often results in the degradation of another. Thus, inks used commercially represent a compromise in an attempt to achieve an ink evidencing at least an adequate performance in each of the aforementioned properties.

In commercially-available thermal ink-jet color printers, such as the DeskJet® printer available from Hewlett-Packard Company, a color spectrum is achieved by combining yellow, magenta, and cyan inks in various proportions. Typically, water-soluble dyes are employed. Black ink is either provided separately or by composite printing all three color inks. In the former case, a water-soluble black dye may be used or, more recently, a pigment-based black colorant may be used.

Water-soluble dyes are commonly used in dye-based inks. However, many dye-based inks, after being printed, exhibit poor water-fastness. There is an increased demand by consumers on the permanence or durability of ink-jet print, including water-fastness, light-fastness, smear-fastness, smudge-fastness, etc. Pigment-based black inks typically evidence the desired water-fastness, but exhibit other undesirable properties, such as slow dry time.

Color ink underprinting has recently received a lot of attention, given the benefits of color bleed, halo, dry time, media independence, and enhanced optical density (OD); see, e.g., application Ser. No. 09/659,666, filed Sep. 11, 2000. As used herein, color bleed refers to the lateral migration of inks which would otherwise lead to mixing at the color interfaces. The halo-effect occurs when two inks of different chemical potentials including surface tension are printed adjacent each other. At the interface between the two inks, there is an apparent depletion of optical density, resulting in the appearance of a "halo".

However, there are two main disadvantages associated with color underprinting: (1) poor waterfastness associated with non-waterfast colors used in the color ink, and (2) the writing system using anionic black inks has required the color inks (anionic dyes) to use highly reactive additives to control bleed at black and color boundaries. While the reactive component is required, in order to create the precipitating or gellation mechanism, these materials have severely limited the dye choices for color inks.

Thus, a printing method is required that provides a printed product having improved properties such as low bleed, high edge acuity, high optical density, fast drying times, good waterfastness, good lightfastness, and good smearfastness without sacrificing performance in other necessary properties.

DISCLOSURE OF INVENTION

In accordance with the present invention, a method of printing an ink onto a print medium is provided. In the method, two inks are employed, a first ink that includes at least one water-soluble, color dye having a first charge and a second ink that includes at least one black pigment having a second and opposite charge. The method comprises:

(a) providing the first ink, which contains at least one water-soluble, color dye having one charge (anionic or cationic) and at least one surfactant;

(b) providing the second ink, which contains at least one black pigment, which has an opposite charge (cationic or anionic);

(c) printing in a first pass across the print medium the first ink; and (d) printing the second ink over the first ink, totally covering and overlapping the first ink, whereby the black pigment(s) reacts with the color dye(s) to form an insoluble complex on the print medium due to the use of opposite charges, thereby improving print speed, print quality, bleed, and waterfastness of the ink.

An ink set for an ink-jet printer is also provided for printing black ink on a print medium to form a printed ink set. The ink set comprises (a) the first ink, above, and (b) the second ink, above. The printed ink set comprises the second ink totally covering and overlapping the first ink.

BEST MODES FOR CARRYING OUT THE INVENTION

The present invention uses cationic black pigment inks and underprinting to give advantages in waterfastness for the black ink. Specifically, the present invention defines an ink system that yields waterfast black prints, even when underprinting with non-waterfast color inks. The present invention defines an ink system that yields waterfast black prints, even if the particular black colorant is not very waterfast shortly after printing.

In accordance with the present invention, two different inks are printed onto a print medium: a first ink that includes at least one water-soluble color dye having a first charge and a second ink that includes at least one black pigment having a second and opposite charge. The method comprises:

(a) providing the first ink, which contains at least one water-soluble color dye having one charge (anionic or cationic) and at least one surfactant;

(b) providing the second ink, which contains at least one black pigment, which has an opposite charge (cationic or anionic);

(c) printing in a first pass across the print medium the first ink; and (d) printing the second ink over the first ink, totally covering and overlapping the first ink, whereby the black pigment(s) reacts with the color dye(s) to form an insoluble complex on the print medium due to opposite charges, thereby improving print speed, print quality, bleed, and waterfastness of the ink.

The net result of using the above black pigment ink, the above color ink, and underprinting with the color ink is a simpler ink system that optimizes the chemistry of each colorant and allows the colorants to complex each other, to yield good waterfastness. This allows much greater latitude in dye choice.

For example and preferably, an anionic color ink may comprise any of the dye-based inks used in ink-jet printing wherein at least one anionic color dye is employed. Many of these inks are well-known and have been disclosed elsewhere; see, e.g., U.S. Pat. Nos. 5,091,005; 5,098,476; 5,100,470; 5,106,416; 5,108,503; 5,112,399; 5,116,409; 5,118,350; 5,133,803; 5,196,056; and 5,198,023, all assigned to the same assignee as the present application. Typically, these inks comprise a vehicle (one or more water-miscible organic solvents and water) and one or more water-soluble dyes, or colorants. Additives may be present to improve a given property, such as waterfastness, color bleed, and the like.

Preferably, a cationic black ink in conjunction with the anionic color inks and may comprise any of the pigment-based inks used in ink-jet printing wherein at least one cationic black pigment is employed. Many of pigment-based inks are well-known and have been disclosed elsewhere; see, e.g., U.S. Pat. Nos. 5,085,698; 5,169,438; and 5,180,425, all assigned to E. I. du Pont de Nemours & Co. Patents are also known that teach combinations of black pigments and color dyes; see, e.g., U.S. Pat. No. 5,745,140, assigned to the same assignee as the present application, and U.S. Pat. Nos. 5,555,008 and 5,801,738, both assigned to E. I. du Pont de Nemours & Co. Modified carbon black, comprising a surface-treated pigment, is disclosed in U.S. Pat. No. 5,985,015, assigned to Seiko Epson Corp. Generally, surface-treated pigments use quaternary ammonium salts. An example of one such cationic black pigment uses a pyridinium salt treated surface, obtained from Cabot Corp. Alternatively, a cationic dispersant may be used in place of the surface treatment.

Any printer that can perform underprinting can be used in the practice of the invention. Reconfiguring an existing printer, such as Hewlett-Packard's DeskJet® 720C, can be done to print the color dye-based ink first, followed by printing the black pigment-based ink thereover.

In operation, the printer prints one volume of color ink in the first pen pass. Then, on the bi-directional retrace, a multiple number of volumes of black ink, for example, six volumes, are printed over the same area. Although six volumes of black ink per one volume of color ink (6:1 black:color) were specifically done, other ratios of ink volume are also expected to work. In particular, a ratio range of 5:1 to 9:1 black:color may be employed. So long as color ink is printed before black ink, the results disclosed herein are expected to be obtained. For example, the color ink can be printed in the same pass as the black ink. In this instance, the black ink is printed about 50 msec after the color ink.

Further, other types of black pigment-based inks should also work. For example, cationic dispersant stabilized carbon black is also expected to be effective.

Additionally, although overprinting black ink with color ink to maintain acceptable hue was not explored, in principle, the overprinting should not affect waterfastness as long as the area is also underprinted with the color ink.

Finally, it will be appreciated that the combination of cationic black pigments and anionic color dyes is most preferred; for example, anionic color dyes are well-established for ink-jet printing, and their properties are well-characterized. However, while the present invention also contemplates the use of anionic black pigments and cationic color dyes, as well as anionic or cationic black dyes in combination with cationic or anionic color pigments, these latter combinations are less preferred.

Use of an anionic colorant (dye) and cationic colorant (pigment) permits matching of the two colorants to form the insoluble complex. The insoluble complex is also formed with the other anionic/cationic combinations discussed immediately above.

The black ink, although it is usually ultimately waterfast, often does not dry fast enough. However, the combination of anionic colorant and surfactant provides a fast drying combination, due to the rapid formation of the insoluble complex and subsequent rapid penetration of the ink vehicle into the print medium. The resulting print is similar to laser-printed black, since the black colorant does not penetrate into the paper. In the case with ink-jet inks that are not underprinted with colorant combinations in accordance with the present invention, the combination of laser-like blackness (O.D.), edge acuity, and fast dry time are not achievable unless reactive additives are used in the color ink.

Since cyan and magenta are both darker than yellow, it is preferred to perform the underprinting with either or both of these two inks. More preferably, for color balance, black over cyan is printed in one pass direction and black over magenta is printed in the opposite pass direction, employing bidirectional printing.

The anionic color dye may be any of the well-known and conventional anionic dyes, preferably sulfonate or carboxylate. The carboxylate dyes are more preferred than the sulfonate dyes, since the carboxylate dyes are usually more waterfast, evidence better bleed control in combination with the black pigment ink, evidence better reduced halo effect, and are better insoluble-complex formers. On the other hand, salts, specifically, di-valent salts such as magnesium and calcium cations, should be avoided when using anionic dyes, due to their propensity to cause precipitation of these dyes.

At least one surfactant is employed with the anionic dye-based ink. The surfactant is present in an amount ranging from about 0.1 to 5 wt %, preferably about 2 wt %, of the ink, and provides a surface tension of about 15 to 40 dynes/cm. Examples include Tergitol and Dowfax surfactants, as well as zwitterionic, Crodofas, and Fluorad surfactants. An example of a zwitterionic surfactant is oleobetaine. The surfactants are used variously to improve wettability of the ink, bleed control, and penetration of the ink into the print medium, and to improve kogation resistance of the resistors used to jet the ink from the pen. Preferably, the upper range of the surface tension of the color ink is approximately the same as the lower range of the surface tension of the black ink.

The balance of the dye-based ink comprises the usual water-miscible solvents, additives, and water.

As mentioned above, the black cationic pigment usually comprises quaternary ammonium groups. Surface-modified pigments are available from colorant vendors, such as Cabot Corp.

The black pigment ink should have a relatively high surface tension, on the order of 35 to 55 cp, or even higher, but not so high that it prevents jetting from the pen. The ink should contain little or no surfactant, so as to prevent wicking of the ink into the paper. The lack of surfactant results in crisp edges of the printed characters. Preferably, the lower range of the surface tension of the black ink is approximately the same as the upper range of the surface tension of the color ink.

The balance of the pigment-based ink comprises the usual water-miscible solvents, additives, and water.

While dispersants may be used with the pigment-based ink, no dispersant is required. Self-dispersing pigments such as those available from Cabot require no dispersant.

The present invention provides a simple color ink that requires no reactive components and enables one to use a variety of dyes, with charge appropriately opposite to the charge on the pigment. Further, no additional substances are having a charge are required in either the color ink or the black ink in order to control bleed, further simplifying the compositions.

EXAMPLES

Example 1 (Comparison)

A pair of aqueous-based inks, one an anionic dye-based ink (cyan I) and the other an anionic pigment-based ink (black), were prepared. The cyan composition is shown in Table I below. The black ink was ftom Hewlett-Packard's black ink cartridge 51645A, such as found in Hewlett-Packard's DeskJet 720C printer

TABLE I

Cyan Dye-Based Ink.

| Component | Cyan I, wt % | Cyan II, wt % |
|---|---|---|
| 2-pyrrolidone | 7.5 | 7.5 |
| 1,5-pentanediol | 8.0 | 8.0 |
| trimethylolpropane | 7.5 | 7.5 |
| $Mg(NO_3)_2 \cdot 6 H_2O$ | 6.0 | — |
| Tergitol 15-S-5 | 2.0 | 2.0 |
| Dowfax 8390 | 0.35 | 0.35 |
| Trizma base | 0.2 | 0.2 |
| Proxel GXL | 0.2 | 0.2 |
| Acid Blue 9-Na salt, absorption at 1/10,000 (630 nm) | D = 0.21 | D = 0.21 |
| Direct Blue 199-TMA salt, absorption at 1/10,000 (622 nm) | D = 0.12 | D = 0.12 |
| water | balance | balance |

Two separate sets of print bars were printed on Gilbert Bond paper, one comprising only the black ink and the other comprising the black ink, but underprinted first with the cyan I ink. The black-cyan combination was printed in a volume ratio of 6:1 black:cyan I.

After 24 hours, a waterfastness test was performed, comprising printing black bars on paper separated by unprinted spaces, placing the printed paper on a clip board supported at 45 degrees, dripping 250 microliters (0.25 ml) water on the printed paper, and measuring transfer of color between printed bars and the unprinted spaces, based on optical density measurements.

The print bars comprising only the anionic black ink evidenced excellent waterfastness. However, the print bars comprising the anionic black ink underprinted with the anionic cyan I ink evidenced poor waterfastness due to the fact that the color ink, which was non-waterfast, ran down the paper.

Example 2 (Invention)

A pair of aqueous-based inks, one an anionic dye-based ink (cyan II) and the other a cationic pigment-based ink (black), were prepared. The cyan II ink was similar to cyan I, used in Example 1, except that the ink did not contain the magnesium salt. The black ink had the composition shown in Table II below.

TABLE II

Cationic Black Pigment Ink.

| Component | Wt % |
|---|---|
| 2-pyrrolidone | 10 |
| 1,5-pentanediol | 10 |
| Cabot Quat IJX-HP016-1A | 5.0 |
| Multranol 4012 | 0.5 |
| Surfynol 465 | 0.10 |
| water | balance |

Two separate sets of print bars were printed on Gilbert Bond paper, one comprising only the black ink and the other comprising the black ink, but underprinted first with the cyan II ink. The black-cyan combination was printed in a volume ratio of 6:1 black:cyan II.

After 24 hours, a waterfastness test was performed, as in Example 1.

The print bars comprising only the black ink evidenced excellent waterfastness and the print bars comprising the black ink underprinted with cyan II ink evidenced considerably improved waterfastness over the combination of Example 1.

Thus, the use of the cationic black pigment ink in combination with the anionic color dye ink shows long term waterfastness improvement over underprinted ink where the black ink is cationic instead of anionic.

A waterfastness test was performed, also as in Example 1, after 5 minutes. No difference in waterfastness was observed after only 5 minutes, compared with 24 hours, for the underprinted combination. However, the non-underprinted black ink, while waterfast after 24 hours, showed considerable lack of waterfastness after only 5 minutes.

Thus, the use of the cationic black pigment ink in combination with the anionic color dye ink shows waterfastness improvement over no underprinted ink.

Industrial Applicability

The combination of a first, underprinted anionic dye-based ink and a second, cationic black pigment-based ink printed thereover is expected to find use in ink-jet printing.

Thus, there has been disclosed a method of printing a first, underprinted anionic dye-based ink and a second, cationic black pigment-based ink printed thereover, which provides improved print speed, print quality, bleed control, and waterfastness. It will be appreciated by those skilled in this art that various changes and modifications of an obvious nature may be made, and all such changes and modifications are considered to fall within the scope of the present invention.

What is claimed is:

1. A method of printing a black ink onto a print medium, said black ink containing at least one black pigment, said method comprising:
    (a) providing a color ink containing at least one water-soluble color dye having a first charge and at least one surfactant;
    (b) providing said black ink, said at least one black pigment having a second and opposite charge;
    (c) printing in a first pass across said print medium said color ink; and
    (d) printing said black ink over said color ink, totally covering and overlapping said color ink such that said black ink is underprinted by said color ink, whereby said at least one black pigment reacts with said at least one color dye to form an insoluble complex on said print medium due to the presence of the opposite charges, thereby improving print speed, print quality, bleed, and waterfastness of said black ink.

2. The method of claim 1 wherein said color dye is selected from the group consisting of cyan, yellow, and magenta.

3. The method of claim 2 wherein cyan ink is printed in one pass in a first direction prior to printing said black ink thereon and magenta ink is printed in an opposite pass in a second direction prior to printing said black ink thereon.

4. The method of claim 1 wherein said surfactant is present in said color ink in a concentration ranging from about 0.2 to 5 wt %.

5. The method of claim 4 wherein said concentration is about 2 wt %.

6. The method of claim 4 wherein said color ink has a surface tension within a range of about 15 dynes/cm up to that of said black ink.

7. The method of claim 1 wherein said black ink has a surface tension of at least that of said color ink.

8. The method of claim 1 wherein said color ink is printed in said first pass and said black ink is subsequently printed in said first pass, in either direction.

9. The method of claim 1 wherein said color ink is printed in said first pass and said black ink is subsequently printed in a second pass.

10. The method of claim 1 wherein said at least one water-soluble color dye in said color ink is anionic and wherein said at least one black pigment in said black ink is cationic.

11. The method of claim 1 wherein one volume of said color ink is printed in an area in said first pass and wherein from five to nine volumes of said black ink are printed over said area.

12. The method of claim 11 wherein six volumes of said black ink are printed over said area.

13. A method of improving print speed, print quality, bleed, and waterfastness of a black ink containing at least one black pigment, said method comprising:
    (a) providing a color ink containing at least one water-soluble color dye having a first charge and at least one surfactant;
    (b) providing said black ink, said at least one black pigment having a second and opposite charge;
    (c) printing in a first pass across said print medium said color ink; and
    (d) printing said black ink over said color ink, totally covering and overlapping said color ink such that for every one volume of said color ink printed in an area, from five to nine volumes of said black ink are printed in said area, whereby said at least one black pigment reacts with said at least one color dye to form an insoluble complex on said print medium due to the presence of the opposite charges.

14. The method of claim 13 wherein said color dye is selected from the group consisting of cyan, yellow, and magenta.

15. The method of claim 14 wherein cyan ink is printed in one pass in a first direction prior to printing said black ink thereon and magenta ink is printed in an opposite pass in a second direction prior to printing said black ink thereon.

16. The method of claim 13 wherein said surfactant is present in said color ink in a concentration ranging from about 0.2 to 5 wt %.

17. The method of claim 16 wherein said concentration is about 2 wt %.

18. The method of claim 16 wherein said color ink has a surface tension within a range of about 15 dynes/cm up to that of said black ink.

19. The method of claim 13 wherein said black ink has a surface tension of at least that of said color ink.

20. The method of claim 13 wherein said color ink is printed in said first pass and said black ink is subsequently printed in said first pass, in either direction.

21. The method of claim 13 wherein said color ink is printed in said first pass and said black ink is subsequently printed in a second pass.

22. The method of claim 13 wherein said at least one water-soluble color dye in said color ink is anionic and wherein said at least one black pigment in said black ink is cationic.

23. The method of claim 13 wherein six volumes of said black ink are printed over said area.

* * * * *